July 31, 1945.　　　　J. K. REED　　　　2,380,870
PADDLE
Filed June 21, 1944
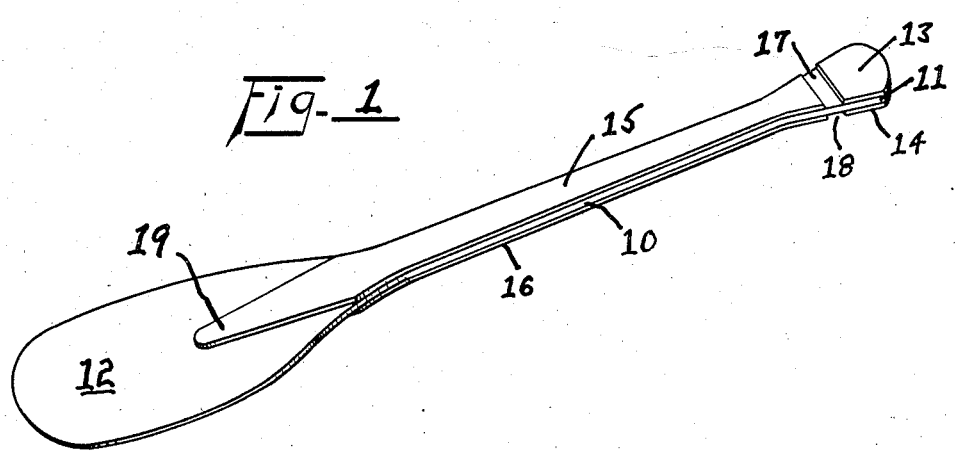
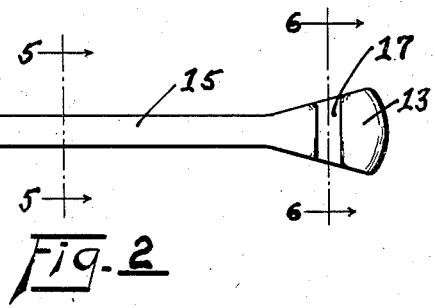
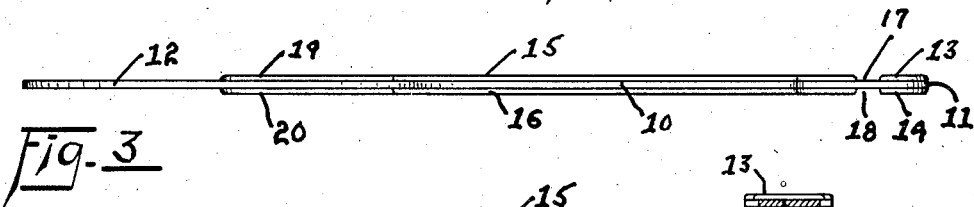
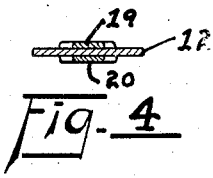
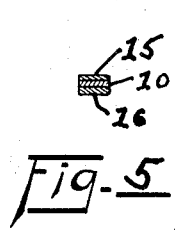
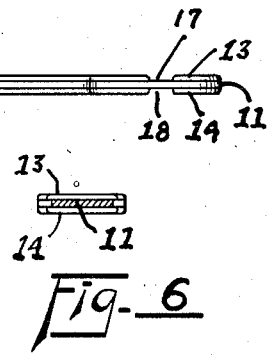
Witness:
G. L. Chafe
Inventor
John K. Reed
By Rice and Rice
Attorneys Patented July 31, 1945

2,380,870

UNITED STATES PATENT OFFICE 2,380,870

PADDLE

John K. Reed, Charlevoix, Mich.

Application June 21, 1944, Serial No. 541,326

1 Claim. (Cl. 9—24)

The present invention relates to paddles and more particularly to paddles for canoes, rafts, dinghys and other small craft.

The primary objects of the instant invention are to provide a paddle of the general character above indicated which is light in weight; to provide such a paddle which is sturdy in construction; to provide such a paddle which is efficient in its intended use; and, to provide such a paddle which is economical in manufacture.

An illustrative embodiment of the invention is shown in the accompanying drawing, wherein:

Figure 1 is a perspective view of the paddle;

Figure 2 is a plan view thereof;

Figure 3 is a side elevational view;

Figure 4 is a sectional view on line 4—4 of Figure 2;

Figure 5 is a sectional view on line 5—5 of Figure 2; and

Figure 6 is a sectional view on line 6—6 of Figure 2.

Referring then to the drawing wherein like parts of the paddle shown are designated by the same numerals in the several views, the same comprises a central plywood member having an intermediate elongated portion 10, here shown as of substantially the same width, an enlarged handle portion 11 and a paddle portion 12.

The handle portion 11 is provided with a pair of oppositely disposed plywood heads 13, 14 secured thereto in any suitable manner as by affixing them thereto with waterproof glue.

The intermediate elongated portion 10 of the paddle is here shown as provided with oppositely disposed elongated plywood members 15, 16 secured thereto as by waterproof glue, the upper end of each being spacedly affixed from proximate heads 13, 14 to provide manual grips 17, 18 and the lower end of each member 15, 16 is provided with a tongue portion 19, 20, each extending beyond the intermediate elongated portion 10 and on opposite sides of the paddle portion to strengthen and reinforce the same.

It will be understood of course that the elongated portion 10, the handle portion 11, paddle portion 12 may be a single plywood member or a plurality of secured plywood members as may be the plywood heads 13, 14 and the oppositely idsposed reinforcing elongated members 15, 16.

It will thus be seen that the paddle herein shown and described is light in weight yet sturdy in construction, is economical in manufacture and is efficient when used as a paddle for canoes, rafts, dinghys or other small craft and while but one specific embodiment of the invention has been herein shown and described, it will be understood that certain details of the construction shown may be altered or omitted without departing from the spirit of the invention as the same is defined by the following claim.

I claim:

A plywood paddle comprising a body having a blade, an enlarged handle and a reduced elongated intermediate part connecting the handle and blade, and a pair of elongated plywood members secured to and contacting the intermediate part throughout the length thereof and having tongues extending over and contacting the blade to reinforce the latter, each of said plywood members being on a side of the paddle which is opposite to that of the other.

JOHN K. REED.